March 10, 1970 B. F. KRUECKEL 3,499,781
PROCESS FOR PRODUCING MULTIPLE LAYER COLORED COATING USING ACTINIC IRRADIATION
Filed Oct. 26, 1967
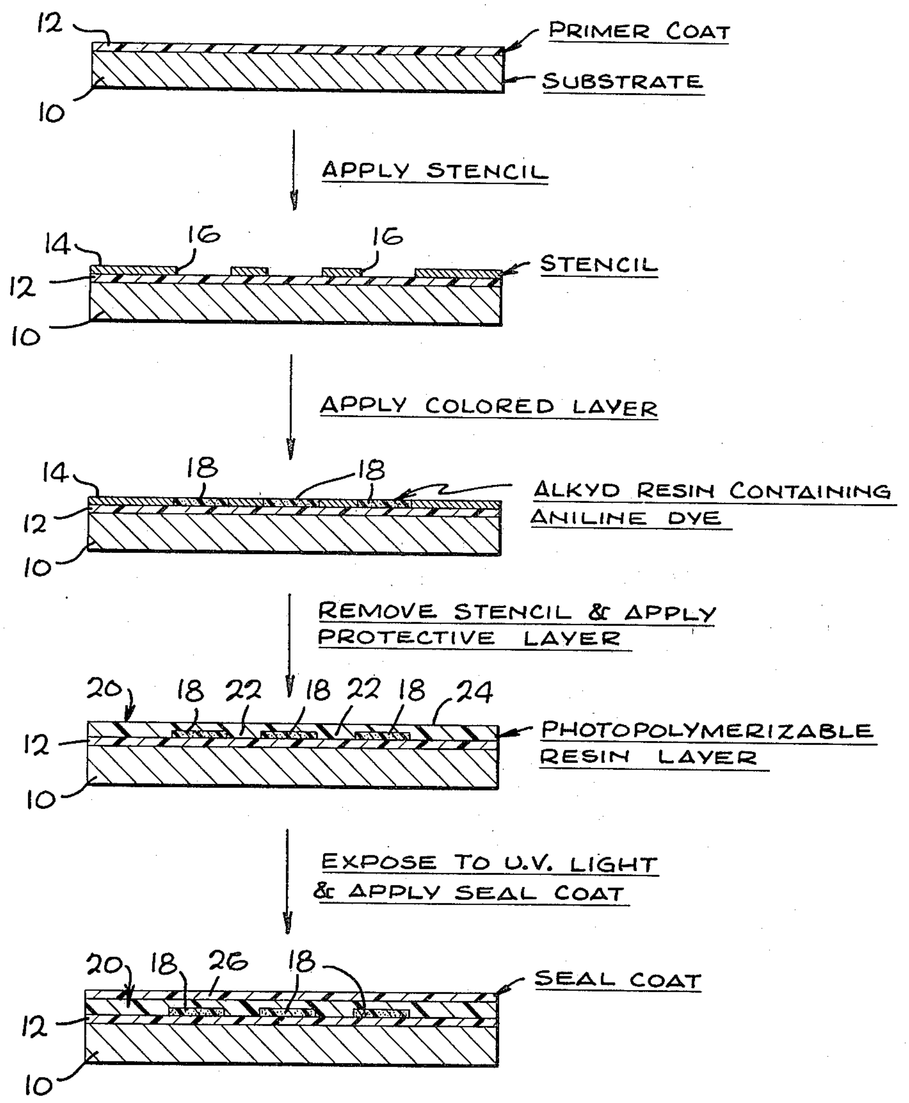
BARBARA F. KRUECKEL
INVENTOR.
BY Max Gelder
ATTORNEY United States Patent Office 3,499,781 Patented Mar. 10, 1970

3,499,781

PROCESS FOR PRODUCING MULTIPLE LAYER COLORED COATING USING ACTINIC IRRADIATION

Barbara F. Krueckel, Santa Monica, Calif., assignor to McDonnell Douglas Corporation, Santa Monica, Calif., a corporation of Maryland Continuation-in-part of application Ser. No. 394,393, Sept. 2, 1964. This application Oct. 26, 1967, Ser. No. 678,346
Int. Cl. B41m 1/12; B44c 1/14
U.S. Cl. 117—38 14 Claims

ABSTRACT OF THE DISCLOSURE

Process for color coating of a surface with an organic colorant protected by an overlayer of a photopolymerized resin to obtain rapid curing of such resin and production of a color-fast, non-bleeding and wear-resistant colored coating which is highly adherent to the substrate surface, according to one embodiment, by applying to a substrate surface a clear alkyd resin as a primer, placing a pattern over said primer layer, applying over said pattern a layer of an organic colorant dispersed in an alkyd resin, removing the pattern, and providing a colored image, applying a layer of a clear, photopolymerizable resin, preferably a polyester, containing a photopolymerization catalyst such as benzoin, exposing the last-mentioned layer to actinic, that is, ultraviolet, light to polymerize the polyester, and, where such last-mentioned polymerization takes place in the presence of oxygen or air, preferably applying a seal coat containing a polyester and a suitable catalyst, and curing to produce a hard substantially non-tacky top coat.

This application is a continuation-in-part of my copending application Ser. No. 394,393, filed Sept. 2, 1964.

This invention relates to the production of colored coatings or designs on a substrate surface, such as metal, wood, plastic, ceramics, glass and the like, used for decorative purposes, and also having industrial applications such as for the production of transparent display panels, by a simple procedure employing organic colorants and a photopolymerizable protective coating which can be rapidly cured to provide a uniform color-fast coating having a hard, resinous, substantially clear or transparent coating securely adhered to the substrate surface.

In my above copending application there is disclosed a color stabilized coating system which comprises a polymerizable vehicle such as a polyester, a colorant dispersed in such vehicle, and a photocatalyst such as benzoin for polymerization of the colored vehicle upon exposure to actinic radiation.

Although the coating composition or system of my above copending application provides a highly versatile system for production of decorative or protective coatings, it has been found that the presence of the organic colorant or dye and the photopolymerization catalyst and photopolymerizable resin in the same layer has the disadvantage that the colorant or dye interferes with the action of the photopolymerization catalyst and tends to inhibit curing of the photopolymerizable resin and increases the time of cure. Also, in the system of my above copending application, the presence of the colorant or dye in the photopolymerizable resin, together with the photopolymerization catalyst, affects the condition of the cure; and, particularly in thin coatings, this results in a tendency toward non-uniform coatings containing lumps, and in order to obtain a smooth, uniform coating employing the system of the above application, it has been found that a thicker coating layer is required, and this tends to increase the time of exposure to actinic light, and of photopolymerization.

It has now been found that the above disadvantages can be overcome and a uniform colored coating, protected by a hard or tough resin layer, can be produced with no bleeding of colorant or dye into the resinous, protective upper layer, and with greater rapidity of curing, by applying in separate layers on a substrate, a layer of an organic colorant dispersed in an alkyd resin, and a layer of a clear photopolymerizable resin, preferably a polyester, containing a photopolymerization catalyst or initiator for said photopolymerizable resin, such as benzoin, and exposing the last-mentioned layer to actinic light to polymerize the photopolymerizable, e.g., polyester, resin. Thus, even though the organic colorant or dye is one which normally interferes with photopolymerization when present in the photopolymerizable resin layer, by placing the dye in a separate layer and incorporating the photopolymerizable, preferably polyester, resin and catalyst therefore in a separate layer into which the dye does not migrate or bleed, upon exposure of the photopolymerizable resin layer to a suitable source of actinic light such as ultraviolet light, the photopolymerizable resin layer cures rapidly, substantially without interference by the presence of the organic colorant or dye.

The term "clear" resin as employed herein is intended to denote a resin substantially free of coloration, and which is translucent or transparent.

Thus, by the procedure of the present application, colored protective coatings of essentially any desired thickness, e.g., ranging from about 4 to about 100 mils, or more, total dry film thickness, can be provided, and which are uniform and free from lumps, in a relatively short exposure or curing cycle, e.g., of the order of about 1 to several, e.g., about 10, minutes. A color-fast, non-bleeding, colored coating on the substrate is thus provided.

Below is described a preferred mode of operation in relation to the accompanying drawing, in which the following steps of operation are carried out:

(1) There is first preferably applied to the surface of a substrate, e.g., metal, designated 10 in the drawing, a primer coat, 12, preferably in the form of a clear alkyd resin, and preferably of the non-oxidizing type, followed by air drying of the resin. A primer coat thickness of, for example, about 1 mil can be employed.

(2) Where a colored image is to be formed on the substrate surface, a suitable pattern, e.g., a silk screen or stencil, indicated at 14, having apertures 16, is then applied to the top of the dry coating.

(3) An organic colorant, preferably an aniline dye, is mixed with a clear, preferably non-oxidizing, alkyd resin of the type employed in step (1) above, e.g., employing about 0.01 to about 5 parts of the dye per 100 parts by weight of the alkyd resin, the amount of dye employed in the resin being that which produces the desired color intensity in the resin film, which can be of the order of about 1 mil dry thickness, for example. If desired, a slurry of the organic colorant or dye in a solvent such as butyl Cellosolve can first be prepared, which is then added to the liquid resin. The resulting alkyd-colorant mix is then applied over the pattern or stencil. This forms a colored pattern 18 by adhesion of the colored resin to the primer in the open spaces 16 provided in the pattern or stencil. Upon drying of the colored alkyd layer, the pattern or stencil 14 is removed.

Steps (2) and (3) above can be repeated several times, employing different patterns or stencils, superimposing one colored pattern upon another to produce shade variations, for example, as in color printing and in textile manufacturing.

(4) A protopolymerizable resin upper layer 20 is then applied over the colored resin layer, such photopolymerizable coating consisting essentially of a photopolymeric resin such as a clear polyester containing a photopolymerization catalyst, preferably an acyloin such as benzoin. A preferred photopolymerizable polyester composition for this purpose is that formed of a mixture of (1) about 75 to about 90% of the resin marketed as Paraplex P–444A, understood to consist of a mixture of about 75% polyester and 25% methyl methacrylate monomer, by weight, marketed by Rohm and Haas, and (2) about 10% to about 25% vinyl toluene monomer, by weight. The vinyl toluene monomer is employed as a thinning agent. To the combination of the above Paraplex P–444A and vinyl toluene monomer there is added a photocatalyst or photoinitiator for the polyester, preferably benzoin, the photocatalyst being empolyed in an amount, e.g., of about 0.5% by weight of the total resin composition. Such photocatalyst is entirely compatible with the resin composition and goes rapidly into solution therein.

(5) Curing or photopolymerization of the photocatlytic polyester layer can be achieved using conventional ultraviolet light sources, such as a General Electric sunlamp emitting actinic or ultraviolet light rays of a wave length generally ranging from about 2,000 to about 4,000 A., such as to activate the photocatalyst, e.g., acyloin such as benzoin, to cause curing of the photocatalytic coating in a period, e.g., of about 5 to about 20 minutes.

Alternatively, for photopolymerization of the polyester, a medium pressure mercury arc-Xenon ultraviolet lamp (Hanovia) can be employed for a more rapid cure, that is, on the order of, say, 15 to 45 seconds; and by employing a laser beam of the proper wave length for activating the photocatalyst, photopolymerization can take place in as little as a second, or fraction thereof.

It will be noted in the drawing that the photopolymeric coating 20 fills the spaces 22 between the colored portions 18 forming the colored pattern, and also covers such colored portions to form a protective layer thereover, which has a smooth uniform surface 24. The polyester layer 20 cures to a thermoset transparent polymer.

(6) If the photopolymerization of the polyester layer 20 is carried out in the absence of oxygen, or air, the application of a seal coat over the photopolymerized layer is generally not necessary. However, where such photopolymerization is carried out in air or in the presence of oxygen, the photopolymerized layer has a slight tackiness in its upper surface. Under these conditions a seal coat 26 is applied thereover.

The seal coat or layer 26 is preferably a polyester, most desirably of a type which produces a hard substantially tack-free surface, and which may include a minor portion of styrene monomer, and has incorporated therein a small amount of a polymerization catalyst which can be a conventional type oxidative curing agent such as cobalt naphthenate or methyl ethyl ketone peroxide, but preferably employing a photocatalyst such as an acyloin, e.g., benzoin, as described above in (4), and subjecting the seal coat to actinic radiation, e.g., an ultraviolet lamp, to rapidly cure the seal coat. For this purpose, e.g., about 0.005 to about 0.5 part by weight of benzoin can be employed per 100 parts of the polymerizable resin composition. If desired, other photopolymerizable resins can be employed for the seal coat, e.g., polyurethanes.

The coatings applied in steps (1), (3), (4) and (6) above can be applied in any suitable manner, such as by brushing, spraying, dipping or flowing the resin formulations onto the area to be coated.

The application of a primer layer in step (1) above is usually preferred, in order to obtain proper adhesion of the alkyd layer containing organic colorant and the photopolymerizable protective layer. Although the primer layer is preferred, it may be omitted, particularly in the case of relatively porous substrates such as wood, ceramics and the like.

As previously noted, where a complex colored pattern or design is to be applied to a substrate, steps (2) and (3) can be repeated several times, before applying the layer of clear polyester containing photocatalyst, that is, step (4). Where such colored design is provided, employing the invention principles, it has been found that there is no bleeding of organic colorants or dyes from the intermediate colored layers into each other or into the top photopolymerized protective layer, e.g., layer 20.

If solid coloration is desired, then step (2) above directed to the application of a pattern is omitted.

With respect to the specific compositions employed in the above-noted steps of the invention process, the alkyd resin preferably employed in the primer coat of step (1) above and also as the vehicle for the organic colorant or dye in step (3) can be any suitable clear alkyd resin composition, e.g., in the form of a solution which can be air dried rapidly and which preferably is of the non-oxidizing type. Such alkyd resins are generally produced by heating phthalic anhydride or other dicarboxylic acids, and glycerol or glycol, and are well known in the art. A preferred commercially available non-oxidizing clear alkyd resin of this type is that marketed as L–161–40 Beckosol Alkyd by Reichold Chemicals, Inc., and which is understood to be in the form of a solution consisting essentially of 40% alkyd resin and 60% xylene as solvent.

The organic colorant incorporated in the alkyd resin for producing the colored layer in step (3) above can be any organic colorant such that the organic colorants or dyes are homogeneously dispersed in the alkyd resin layer. It has been found that preferred organic colorants are the various aniline dyes. Suitable aniline dyes for the purpose of the invention include, for example, Iosol Red, B.C. 74708; Iosol Black, B.C. 74704; Iosol Yellow, B.C. 74711; Iosol Orange, B.C. 74707; Iosol Violet, B.C. 74710; Iosol Green, B.C. 74706; and Iosol Blue, B.C. 74705. All of the above dyes are marketed by Allied Chemical Corporation. There can also be employed those aniline dyes supplied under the trade name Azosol and produced by General Aniline and Film Corporation. These may be classified according to the following chemical categories: azo acids or amions (Fast Orange RA, Fast Brilliant Red BN and 3BA, Fast Yellows RCA and GT); azine base or cation (Spirit Nigrosine SSB); sulfonate cupric phthalocyanine (Fast Blues HLD and HLR); azo acid phthalocyanine mix (Fast Green HLAS;) and triphenylmethanes (Brilliant Green BA and Methyl Violet XXA). Also, organic fluorescent colorants such as fluorescent dyes can be employed, e.g., Rhodamine B, Calcofluor Yellow HEB, and the like. When employing fluorescent colorants, generally larger amounts thereof are used than when employing the above noted aniline dyes.

To facilitate incorporation of these dyes into the alkyld resin, if desired, such dyes can be first incorporated in a small amount of a solvent such as butyl Cellosolve, to produce a paste and facilitate dispersing the dye in the resin.

The photopolymerization resin employed to provide the protective coating in step (4), noted above, preferably is a polyester. These are generally unsaturated polyesters, including polyesters produced by the esterification of an ethylenically unsaturated polycarboxylic, preferably dicarboxylic, aliphatic acid, or their anhydrides, with a polyhydroxy organic compound, e.g., a polyhydric alcohol, preferably a dihydric alcohol. Examples of unsaturated dicarboxylic acids and anhydrides thereof which can be employed include the aliphatic unsaturated dibasic acids and their anhydrides including maleic acid and its anhydride, fumaric acid, methyl fumaric acid, itaconic acid, citraconic acid, and the like. Also, unsaturated tricarboxylic acids such as aconitic acid may be employed. The above aliphatic unsaturated polybasic acids can be employed separately, or in combination with aromatic dicarboxylic acids and their anhydrides, such as isophthalic acid, phthalic acid and its anhydride, tetrahydronaphthalic acid and its anhydride, 1,2 naphthalene dicarboxylic acid and its anhydride. If desired, the polyester resin can be modified by use of a polybasic aliphatic acid which does not contain polymerizable olefinic groups. Thus, saturated polybasic acids, such as saturated aliphatic dibasic acids, can be used in combination with the ethylenically unsaturated polycarboxylic acids described above, for modifying the polymer, e.g., to impart flexibility thereto. Examples of such saturated polybasic acids include adipic, suberic and azelaic acids.

The polyhydroxy organic compound employed for esterification of the above unsaturated aliphatic acids can include both aromatic and aliphatic polyhydroxy compounds, the latter being preferred. Thus, for example, there may be employed Bisphenol-A and its derivatives, and other dihydroxy phenols. Preferably, the glycols, including the diglycols and triglycols are employed, such as the alkylene glycols, e.g., ethylene glycol and propylene glycol, and the polyalkylene glycols such as diethylene glycol, triethylene glycol, tetraethylene glycol, dipropylene glycol, and the like.

The proportions of polybasic aliphatic unsaturated acid, polybasic aromatic acid, and saturated polybasic acid, when used, in relation to the polyhydroxy compound, are chosen to obtain the desired hardness, flexibility and chemical resistance characteristics of the polymerized polyester. Such polyester resins are well known in the art.

The polyester resin preferably is dissolved with a vinyl monomer. By the term "vinyl monomer" is meant a monomer containing the vinyl radical, including, for example, styrene, vinyl toluene, vinyl acetate, diallyl phthalate, diallyl isophthalate, acrylic and methacrylic esters, or mixtures thereof. The resin formulation including the vinyl monomer is usually in the form of a liquid. A particularly useful polyester vehicle for purposes of the invention consists essentially of a major proportion of polyester and a minor proportion of vinyl toluene monomer, and which preferably also can contain a minor proportion of methyl methacrylate monomer.

If desired, other resins, e.g., a cellulose acetate-butyrate, resin, can be added to the polyester resin to modify the film forming characteristics of the polyester resin formulation and improve the flexibility and toughness of the cured resin film or coating.

The amount of photopolymerizable resin, preferably polyester, which can be present in the photopolymerizable resin formulation can range from about 50% to about 90% by weight of the resin formulation, and generally constitutes a substantial or major portion of the formulation. A preferred polyester photopolymerizable resin formulation for production of a cured protective coating, according to the invention, is one which contains about 75% to about 90% of the material marketed as Paraplex P–444A by Rohm and Haas, understood to be a mixture of 75% polyester and 25% methyl methacrylate monomer; and about 10% to about 25% vinyl toluene monomer.

Although the above described polyesters are preferred, other suitable photopolymerizable resins, for example, polyurethane resins, and the like, can be employed, to provide the protective coating in step (4) above.

When employing a seal coat in step (6) above, substantially the same types of polymerizable resins, e.g., polyesters and polyurethanes, are used as in step (4), except that the particular resins employed are those which produce a tack-free surface. An example of such a polyester resin is that marketed as Ramanel Finish Clear 56–X5.

The photocatalyst or photoinitiator incorporated with the photopolymerizable resin for curing same can include any of the known free-radical producing catalysts for unsaturated compounds such as the polyester resins. Preferably, the photocatalyst employed is an acyloin such as benzoin, butyroin, diacetyl or 1-phenyl-1,3-butanedione. Benzoin has been found to be particularly suitable. A minor amount of photopolymerization catalyst is employed, generally ranging from about 0.01% to about 3%, usually about 0.2% to about 1.0%, by weight of the total resin formulation.

The following are examples of practice of the invention.

EXAMPLE 1

(a) Using a substrate of galvanized iron sheet metal, 0.045" x 2 ft. x 3 ft. (prepared by light surface grit sand blast and a toluene-methyl ethyl ketone solvent wipe), one primer spraycoat of "L–161–40 Beckosol," a clear non-oxidizing alkyd, was applied to a 1 mil dry film thickness and was air-dried for one minute.

(b) A stencil pattern was superimposed on the tack-free primer coating.

(c) One spraycoat of metallic gold nitro-cellulosisc lacquer was applied to fill the apertures in the stencil pattern, and was air-dried to a 0.5 mil dry film thickness for the purpose of producing in the end product a changeable pattern effect, depending upon variation in the angle of incident light by which the coated substrate was viewed.

(d) The stencil was removed.

(e) One translucent spraycoat, consisting of "Beckosol" alkyd, 100 parts by weight (PBW) mixed with 0.8 PBW "Iosol Red, B.C. 74708," a powdered aniline dyestuff, was applied and air-dried for three minutes to a 3 mil dry film thickness.

(f) Two spray applications of clear photopolymeric topcoat were then applied, the first to a wet film thickness of 3 to 4 mils, and the second to a wet film thickness of 5 to 7 mils. Each spray application consisted of (1) 100 parts by volume (PBV) "Paraplex P–444–A," composed of 75% unsaturated polyester and 25% methyl methacrylate monomer, and (2) 25 PBV vinyl toluene monomer, and 0.03 PBW benzoin photocatalyst, based on the weight of the total formulation. Each of the above two photopolymeric layers was cured under an ultraviolet light source, a General Electric 250 watt sunlamp, for a period of about 5 minutes.

(g) One photopolymeric sealant spraycoat of 100 PBW "Ramanel Finish Clear 56–X5," a polyester resin marketed by Ram Chemical, Gardena, Calif., mixed with 0.005 PBW benzoin, was applied to a 0.5 mil dry film thickness. This seal coat was exposed to a G.E. sunlamp as in step (f) above to cure the seal coat and provide a hard, substantially non-tacky surface.

Total overall film thickness was about 7 to 8 mils.

The resulting coated substrate was thus provided with a smooth, hard, uniform coating containing a red image protected by an abrasion resistant upper coating, free from colorant bleeding and providing a true-color, lightfast image. The application of the gold lacquer layer in step (c) above, together with the red aniline dye in step (e), results in a chatoyant effect when viewed, and presenting two shades of red, one by the gold lacquer underlayer, and the other by the colored alkyd overlayer.

EXAMPLE 2

The procedure of Example 1 is followed, except that steps (b), (c) and (d) are omitted.

The result is a solidly colored red coating on the substrate, protected by the abrasion-resistant, transparent, upper cured polyester layers provided by steps (f) and (g).

EXAMPLE 3

(a) Using a substrate of aluminum sheet metal, 0.032 inch x 3 feet x 8 feet (prepared as in Example 1, but now eliminating the clear alkyd prime coat), one translucent spraycoat consisting of "Beckosol" alkyd, 100 PBW, mixed with 0.02 PBW "Iosol Black, B.C. 74704," with 0.7

PBW "Iosol Yellow, B.C. 74711," to obtain an off-yellow or ochre coloration, was applied to a 2 mil dry film thickness and air-dried for 3 minutes.

(b) A stencil pattern was superimposed on the alkyd layer provided in (a).

(c) One translucent spraycoat consisting of "Beckosol" alkyd, 100 PBW, mixed with 1 PBW "Iosol Orange, B.C. 74707," and 0.5 PBW "Iosol Red 4B, B.C. 74709" was applied to a 1 to 2 mil dry film thickness, and after removing the stencil, the panel was exposed to an infra-red light source between 1 to 2 minutes to produce a special design effect.

(d) The procedure of steps (f) and (g) in Example 1 was then folowed, except that in step (f) the photopolymeric topcoat contained 30 PBV vinyl toluene for a more flexible end product. Total dry film thickness of the overall coating was about 4 to about 5 mils.

A bright multicolored decorative coating was thus provided on the aluminum substrate, having a tough transparent protective resin overlayer, with no color bleeding from the dyes into the protective upper layer.

EXAMPLE 4

(a) Using a substrate of plywood, ¾ inch x 4 feet x 8 feet, one spraycoat of metallic silver lacquer was applied for its hiding power.

(b) One spraycoat of "Beckosol" alkyd was applied to a 2 mil dry film thickness.

(c) One spraycoat of the clear photopolymeric coating as in Example 1 (f) was applied, with the following exceptions: (1) 20 PBW of the vinyl toluene monomer component, and (2) 0.5 PBW of benzoin, were employed and the coating was applied to a 4 mil dry film thickness and cured under an ultraviolet light source.

(d) A stencil pattern was superimposed on the coating applied in (c).

(e) One translucent spraycoat of "Beckosol" alkyd, 100 PBW, mixed with 0.7 PBW "Iosol Violet, B.C. 74710," was applied to a 2 mil dry film thickness and air-dried for 3 minutes.

(f) After removing the first stencil, a second stencil was placed in position to partly reveal the first pattern.

(g) Step (e) was repeated with the substitution of 0.6 PBW "Iosol Green, B.C. 74706."

(h) Steps (f) and (g) above were repeated with the substitution of 0.5 PBW "Iosol Blue, B.C. 74705."

(i) The procedure of steps (f) and (g) in Example 1 was caried out with the following exceptions in step (f): (1) vinyl toluene 15 PBV, and (2) benzoin, 1 PBW, were employed, and a total 120 mil dry film thickness was obtained. The end product was a plywood substrate having a multicolor overlay pattern free from color migration.

EXAMPLE 5

Using a substrate of "Plexiglas," polymethyl methacrylate, ⅜ inch x 4 feet x 8 feet, the procedure of Examples 1 and 2 was repeated, with the exception that panel preparation consisted solely of a methyl ethyl ketone wipe.

EXAMPLE 6

(a) Using an aluminum sheet metal substrate as in Example 3 above, one roll-on coat of "Beckosol" alkyd, 100 PBW, mixed with 40 PBW of Rhodamine B, a fluorescent red colorant, was applied.

(b) One spray application of clear, photopolymeric topcoat, as in Example 1(f), was then applied, with the following exceptions: (1) benzoin concentration was 1.0 PBW; (2) dry film thickness was approximately 2 mils in order to achieve fluorescence.

(c) The procedure of Example 1(g) was then followed.

An aluminum substrate having a fluorescent red coating protected by a tough, thin transparent plastic upper layer was produced.

From the foregoing, it is seen that the invention provides novel, versatile procedure for applying to a substrate surface of any suitable type, including metal, wood, glass, ceramics, plastic, and the like, a colored coating protected by a tough, abrasion-resistant, resinous, translucent or transparent upper coating, such procedure being rapidly carried out by curing of the upper photopolymerizable coating with a suitable actinic light source, the resulting colored coating being color-fast and resistant to bleeding of the organic colorant into the upper protective layer. By the invention procedure, decorative, e.g., floral designs of simple or complex nature and having a plurality of colors, can be produced, or any other colored, decorative design, and also the procedure of the invention can be employed for the production of substrates or panels having pre-determined colored designs or patterns therein with translucent or transparent protective upper layers, adapted for industrial application.

I claim:

1. A process for preparing a colored coating on a substrate, said coating comprising a first layer of an organic colorant which interferes with the action of photopolyerization catalysts, dispersed in an alkyd resin and a second layer of a clear, uncolored, photopolymerized resin, said process comprising applying on said substrate said organic colorant dispersed in a solution of said alkyd resin, said solution containing all of said colorant present in said colored coating, drying said dispersion to form said first layer, applying over said first layer a clear, photopolymerizable resin and a photopolymerization curing catalyst therefor, said photopolymerizable resin containing all of the curing catalyst provided in said colored coating, and exposing said photopolymerizable resin and curing catalyst to actinic light to photopolymerize said photopolymerizable resin to form said second layer without interference from said organic colorant.

2. The process of claim 1 wherein said photopolymerizable resin consists essentially of a mixture of (1) about 75 to about 90% by weight of a mixture containing about 75% polyester and about 25% monomeric methyl methacrylate, and (2) about 25 to 10 weight percent vinyl toluene.

3. The process of claim 1 wherein said photopolymerization curing catalyst is an acyloin.

4. The process of claim 3 wherein said acyloin is benzoin.

5. The process of claim 1 wherein the surface of said substrate is prepared to receive said colored coating by applying a primer coat of an alkyd resin solution and drying said solution.

6. The process of claim 1 wherein said colored coating is sealed by applying a polymerizable resin containing a polymerization catalyst therefor and activating said polymerization catalyst to polymerize said resin of said sealing coat.

7. The process of claim 1 wherein said organic colorant is an aniline dye.

8. The process of claim 1 wherein said first layer is applied selectively to the substrate surface through a stencil or silk screen, and said silk screen or stencil is removed subsequent to said drying step.

9. The process of claim 8 wherein said first layer is applied in a plurality of successive applications, each utilizing a different stencil or silk screen.

10. A process of preparing a colored coating on a substrate selected from the group consisting of metal, wood, glass, ceramics, and hard plastic, comprising a first layer of an aniline dye which interferes with the action of photopolymerization catalysts, dispersed in an alkyd resin and a second layer of a clear, uncoated, photopolymerized resin, said process comprising applying on said substrate a dispersion of about 0.01 to about 5 parts by weight of said aniline dye in a solution containing 100 parts by weight of said alkyd resin, said dispersion containing all of said dye in said colored coating, drying said dispersion to form said first layer, applying over said first layer a clear photopolymerizable resin consisting essentially of a mixture of (1) about 75 to 90% by weight of a mixture of about 75% photopolymerizable polyester and 25% methyl methacrylate monomer by weight and (2) about 25 to 10% by weight of vinyl toluene, and a photopolymerization curing catalyst therefor comprising about 0.01 to 3% by weight of benzoin, said photopolymerizable resin containing all of the curing catalyst provided in said colored coating, and exposing said photopolymerizable resin and catalyst to actinic light to photopolymerize said photopolymerizable resin to form said second layer without interference from said dye.

11. A process for preparing a colored coating on the surface of a substrate selected from the group consisting of metal, wood, glass, ceramics, and hard plastic, said coating having a transparent protective overlayer, which comprises applying to said substrate surface a primer coat of a solution of a clear alkyd resin, drying said resin, applying over said primer coat a stencil or a silk screen pattern, applying over said pattern a colored coating of a solution of a clear alkyd resin containing about 0.01 to about 5 parts of an aniline dye which interferes with the action of photopolymerization catalysts, per 100 parts by weight of said last-mentioned alkyd resin, drying said colored alkyd layer, removing said pattern, applying over said colored alkyd layer, a layer of a clear photopolymerizable polyester composition consisting essentially of a mixture of (1) about 75 to about 90% of a mixture of about 75% photopolymerizable polyester and 25% methyl methacrylate monomer, by weight, and (2) about 10% to about 25% vinyl toluene monomer, by weight, said polyester resin composition containing about 0.01 to about 3% by weight of benzoin photopolymerization catalyst, exposing said polyester layer to ultraviolet light to activate said benzoin catalyst and polymerizing said polyester.

12. The process of claim 11, including the steps of applying over said photopolymerized polyester layer, a seal coat of a photopolymerizable polyester containing a small amount of benzoin as photopolymerization catalyst, and exposing said seal coat to ultraviolet light to activate said catalyst and polymerize said polyester of said seal coat, to produce a seal coat having a hard, substantially tack-free surface.

13. A process as defined in claim 11, which includes applying a plurality of said successive patterns, in each case followed by application of said colored alkyd layer over the pattern to form a plurality of multicolored layers, followed by said applying said layer of photopolymerizable polyester over said multicolored layers.

14. The process of claim 13, including the steps of applying over said photopolymerized polyester layer, a seal coat of a photopolymerizable polyester containing a small amount of benzoin as photopolymerization catalyst, and exposing said seal coat to ultraviolet light to activate said catalyst and polymerize said polyester of said seal coat, to produce a seal coat having a hard, substantially tack-free surface.

References Cited

UNITED STATES PATENTS

| | | | |
|---|---|---|---|
| 2,471,329 | 5/1949 | Keuffel | 117—12 |
| 2,484,529 | 10/1949 | Roedel | 204—159.14 |
| 2,850,445 | 9/1958 | Oster | 204—158 |
| 3,013,895 | 12/1961 | Agruss | 117—93.31 X |
| 3,047,422 | 7/1962 | Sites | 117—12 X |
| 3,068,118 | 12/1962 | Biskup et al. | 117—76 |
| 3,240,619 | 3/1966 | Winchester | 117—72 X |
| 3,287,152 | 11/1966 | Alles et al. | 117—93.31 X |

OTHER REFERENCES

Alkyd Resins by C. R. Martens: Reinhold Publishing Corp. (1961), p. 79.

WILLIAM D. MARTIN, Primary Examiner

W. R. TRENOR, Assistant Examiner

U.S. Cl. X.R.

35—1; 96—115; 117—45, 72, 93.31, 123, 132, 148; 204—159.14